United States Patent
Offenhuber et al.

(10) Patent No.: US 7,594,393 B2
(45) Date of Patent: Sep. 29, 2009

(54) APPARATUS FOR INTRODUCING A REDUCING AGENT INTO THE EXHAUST OF AN INTERNAL COMBUSTION ENGINE

(75) Inventors: Michael Offenhuber, Adnet (AT); Franz Lackner, Flachau (AT); Johann Siller, Puch bei Hallein (AT); Olivier Marco, Salzburg (AT); Rainer Reiter, Marzoll (DE)

(73) Assignee: Robert Bosch GmbH, Stuttgart (DE)

( * ) Notice: Subject to any disclaimer, the term of this patent is extended or adjusted under 35 U.S.C. 154(b) by 332 days.

(21) Appl. No.: 10/577,990

(22) PCT Filed: Sep. 7, 2004

(86) PCT No.: PCT/DE2004/001984

§ 371 (c)(1),
(2), (4) Date: May 3, 2006

(87) PCT Pub. No.: WO2005/045209

PCT Pub. Date: May 19, 2005

(65) Prior Publication Data

US 2007/0068525 A1    Mar. 29, 2007

(30) Foreign Application Priority Data

Nov. 4, 2003   (DE) ............... 103 51 458

(51) Int. Cl.
*F01N 3/00*   (2006.01)
(52) U.S. Cl. ................. 60/286; 60/295; 60/301; 60/303

(58) Field of Classification Search ............ 60/286, 60/295, 301, 303
See application file for complete search history.

(56) References Cited

U.S. PATENT DOCUMENTS

| 3,783,849 | A | * | 1/1974 | Bramfitt ................... 123/576 |
| 5,272,871 | A | * | 12/1993 | Oshima et al. ............. 60/274 |
| 5,884,475 | A | | 3/1999 | Hofmann et al. |
| 6,063,350 | A | * | 5/2000 | Tarabulski et al. ....... 423/239.1 |
| 6,399,034 | B1 | * | 6/2002 | Weisweiler ............ 423/213.2 |
| 6,804,949 | B2 | * | 10/2004 | Andrews et al. ............ 60/272 |
| 7,017,335 | B2 | * | 3/2006 | Huber et al. ............... 60/286 |
| 7,263,972 | B2 | * | 9/2007 | Tokuda et al. ............. 123/431 |
| 2003/0033799 | A1 | | 2/2003 | Scheying | |

FOREIGN PATENT DOCUMENTS

| DE | 44 32 576 A1 | 3/1996 |
| DE | 199 46 900 A1 | 12/2000 |
| DE | 100 47 512 A1 | 8/2002 |
| EP | 0 928 884 A2 | 7/1999 |
| WO | WO 03/016687 A1 | 2/2003 |

* cited by examiner

*Primary Examiner*—Binh Q Tran
(74) *Attorney, Agent, or Firm*—Ronald E. Greigg

(57) ABSTRACT

An apparatus for introducing a reducing agent into the exhaust of an internal combustion engine, having a reservoir, a delivery unit, and a flow path for the reducing agent. The apparatus also has a ventilation device for ventilating the flow path and is situated at a geodetic high point of the flow path and even in the closed state, permits a return of a minimal fluid quantity to the reservoir.

19 Claims, 3 Drawing Sheets

APPARATUS FOR INTRODUCING A REDUCING AGENT INTO THE EXHAUST OF AN INTERNAL COMBUSTION ENGINE

CROSS-REFERENCE TO RELATED APPLICATIONS

This application is a 35 USC 371 application of PCT/DE 2004/001984 filed on Sep. 7, 2004.

BACKGROUND OF THE INVENTION

1. Field of the Invention

The present invention relates to an apparatus for introducing a reducing agent, which in particular contains urea, into the exhaust of an internal combustion engine, having a reservoir, a delivery unit, and a flow path for the reducing agent, and having a ventilation device for ventilating at least one region of the flow path.

2. Description of the Prior Art

An apparatus for aftertreating the exhaust of an internal combustion engine, known from DE 101 16 214 A1, stores a urea/water solution in a reservoir and delivers it to a mixing chamber by a delivery pump. Compressed air is blown into the mixing chamber. The resulting aerosol of compressed air and urea/water solution is blown into an exhaust line upstream of a catalytic converter. In this case, the urea serves to reduce NOx in the catalytic converter.

The previously known systems operate with a diaphragm pump to supply the urea/water solution but their delivery capacity is reduced when air is present in the flow path on the suction side and in particular in a pump head, and the system must therefore be bled. In the known apparatus, bleeding occurs by means of a solenoid valve that must be triggered by a control unit. In the operation of this solenoid valve, however, it has turned out that even when the solenoid valve is open, it is not always possible to assure the ventilation of the flow path for the reducing agent.

The object of the present invention, therefore, is to modify an apparatus of the type described above so that it functions in the most reliable way possible.

This object is attained in that the ventilation device is situated at a geodetic high point of the flow path and in that the ventilation device has an opening, which permits a constant return of a minimal fluid quantity to the reservoir.

SUMMARY AND ADVANTAGES OF THE INVENTION

The placement of the ventilation device at a geodetic high point of the flow path allows the ventilation to be executed at the point at which the air collects. This achieves a particularly effective ventilation, which results in a particularly high efficiency of the delivery unit, for example a diaphragm pump. The primary result of significantly reducing or completely eliminating air in the flow path is the significant reduction in the time that elapses from the moment the delivery unit is switched on to the moment it actually starts delivering the reducing agent.

A clogging of the ventilation device is prevented by the fact that it has an opening that always permits a return of fluid. Urea dissolved in water has a particular tendency to crystallize when exposed to air. Since the ventilation device is never completely closed, urea crystals possibly adhering to the opening are entrained by the returning fluid and dissolved again. The opening is thus "cleaned" and kept open by the constant flow of fluid. This measure according to the present invention assures the ventilation function of the ventilation device even if an actual ventilation has not been executed for an extended period of time. This significantly increases the operational reliability of the apparatus.

According to a first embodiment of the present invention, the ventilation device includes a float valve. In the presence of air bubbles or aspirated air, a float valve of this kind unblocks an enlarged opening, allowing the air to escape quickly. Then the float reduces the opening cross section back to its minimal dimension again in which a small, constant flow of fluid escapes. A float valve of this kind is relatively simple in design and prevents unnecessary flow losses when the fluid path is sufficiently ventilated.

As an alternative, it is also possible for the ventilation device to include a solenoid valve. A valve of this kind functions in a very precise manner.

The ventilation device is particularly simple in design when it is embodied in the form of a flow throttle. In order to prevent excessive flow losses during normal operation of the apparatus, however, the cross section of the flow throttle must be relatively small.

It is advantageous if the ventilation device is contained in a filter or in close proximity to a filter. This is based on the concept that urea/water solutions freeze at temperatures below $-11°$ C., and in order to be able to carry out the NOx reduction in the catalytic converter even at such low temperatures, it is necessary to be able to heat the apparatus. Particularly after parking for long periods at low temperatures (less than $-11°$ C.), the urea/water solution must first be thawed before it is possible to start dispensing the reducing agent. Air inclusions in the frozen urea/water solution and in particular in the region of a filter, however, reduce the transmission of heat from the heater into the urea/water solution and thus prolong the time required to thaw the frozen urea/water solution. The placement of the ventilation device in a filter or in close proximity to a filter reliably prevents the presence of such air inclusions in the urea/water solution in the vicinity of the filter, which accelerates the thawing of the frozen urea/water solution.

In a modification of this, the filter can operate in two installation positions that differ by approximately 90° and the ventilation device is situated at an angle of approximately 45° between the two installation positions. This makes it possible to install the apparatus, for example in motor vehicles, in the two main installation positions as a function of the installation requirements, without having to change the integration of the ventilation device.

It is also advantageous if the ventilation device is situated upstream of the delivery unit. This assures that no air is present in the flow path on the suction side of the delivery unit so that the delivery capacity of the delivery unit is available the moment it is switched on.

BRIEF DESCRIPTION OF THE DRAWINGS

Particularly preferred exemplary embodiments of the present invention will be explained in greater detail below, in conjunction with the accompanying drawings, in which.

DESCRIPTION OF THE PREFERRED EMBODIMENTS

Figure 1:
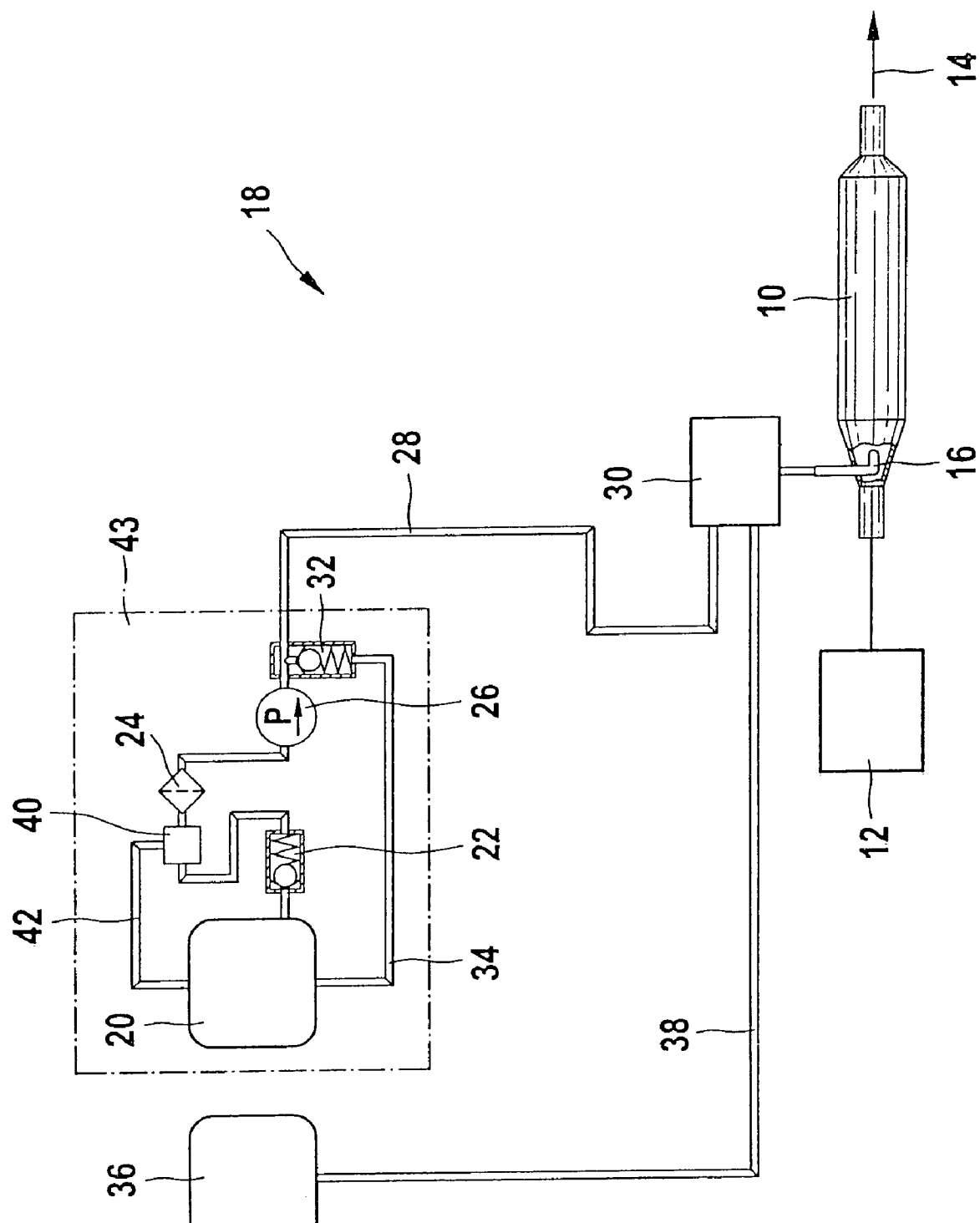
FIG. 1 is a schematic depiction of a first exemplary embodiment of an apparatus for introducing a reducing agent into the exhaust of an internal combustion engine.

FIG. 1 shows a catalytic converter of an exhaust system of an internal combustion engine, which is labeled as a whole with the reference numeral 10. The exhaust is supplied to the catalytic converter 10 from combustion chambers 12 of the internal combustion engine that are only depicted schematically in the drawing. The exhaust flows through the catalytic converter 10 and exits it in the direction of the arrow 14. The catalytic converter 10, in connection with the vaporized components of a urea-containing solution, acts to reduce $NO_x$ components in the exhaust. To this end, a nozzle 16 injects an aerosol into the exhaust flow. This aerosol contains urea as a reducing agent for $NO_x$ conversion. The aerosol is produced by an apparatus labeled as a whole with the reference numeral 18 in FIG. 1.

The apparatus 18 has a reservoir 20 in which a urea/water solution is stored. A delivery unit 26, which is embodied in the form of a diaphragm pump, delivers the urea/water mixture from this reservoir 20 via a check valve 22 and a filter 24, by means of a line 28 to mixing chamber 30 (the use of certain diaphragm pumps also permits elimination of the check valve 22). A pressure control valve 32 sets the pressure in the line 28. The outlet of this pressure control valve 32 is connected via a return line 34 to the reservoir 20 in this instance (alternatively, it would also be possible to connect it to the suction side of the delivery unit 26). A compressed air supply 36 feeds compressed air to the mixing chamber 30 via a compressed air line 38. From the mixing chamber 30, the water/urea/air mixture travels to the nozzle 16, where it is atomized, thus producing the aerosol.

The line 28 of the apparatus 18 is routed so that the filter 24 is situated at the geodetically highest point of the apparatus 18. At this geodetically highest point, a ventilation device 40 is positioned in the line 28 directly upstream of the filter 24. A ventilation line 42 leads from the ventilation device 40 back to the reservoir 20. The entire assembly comprised of the reservoir 20, valves 22 and 32, filter 24, and pump 26 can be heated. The corresponding heating device is indicated with a dot-and-dash line in FIG. 1 and is labeled with the reference numeral 43.

Figure 2:
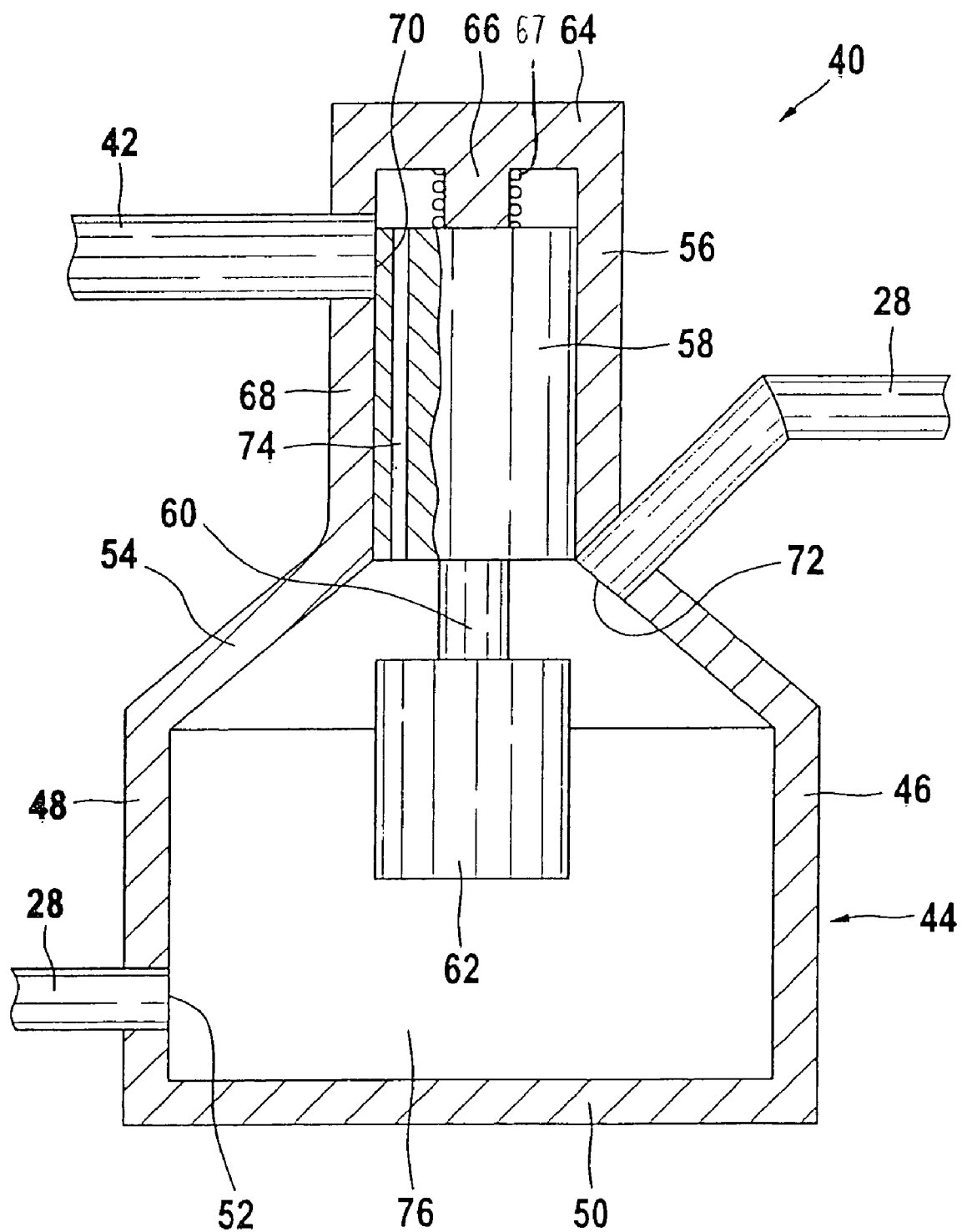
FIG. 2 is a partial section through a ventilation device of the apparatus from FIG. 1.

The ventilation device 40 in the current exemplary embodiment is a float valve. Its basic design is shown in FIG. 2:

The float valve 40 has a housing 44 with a circular, cylindrical, cup-shaped base section 46. There is an opening 52 in a circumferential wall 48 of the base section 46, in the region of a bottom 50 of the base section 46. The line 28 coming from the reservoir 20 and/or from the check valve 22 feeds into this opening 52. Above the base section 46, there is a transition section 54 that tapers in a funnel shape, onto which a cylindrical valve section 56 is formed. A cylindrical valve element 58 is guided in a sliding, fluid-tight manner in this valve section 56. A connecting rod 60 on the valve element 58 toward the base section 46 of the housing 44 is connected to a float 62.

The valve section 56 of the housing 44 is closed toward the top by a cover 64. In the middle of the cover 64, a pin-like spacer 66 extends toward the valve element 58. A compression spring 67 around this spacer 66 is clamped between the cover 64 and the valve element 58. A circumferential wall 68 of the valve section 56 of the housing 44 is provided with a ventilation opening 70, which is connected to the ventilation line 42.

Diametrically opposite from the inlet opening 52 in the transition section 54, just before it transitions into the valve section 56, an outlet opening 72 is provided, which is connected to the line 28 leading to the filter 24. The spacer 66 is long enough that when the valve element 58 contacts the spacer 66, the ventilation opening 70 is not completely covered. A duct 74 passes through the valve element 58 in its longitudinal direction. The chamber enclosed by the housing 46 is referred to as the ventilation chamber 76.

The float valve 40 functions as follows:

If air is present in the section of the line 28 upstream of the float valve 40, then it collects at the geodetically highest point of the apparatus 18, namely in the ventilation chamber 76 of the float valve 40. But if the ventilation chamber 76 is filled with air, then the buoyancy of the float 62 does not come into play and the compression spring 67 presses the valve element 58 downward in FIG. 2 so that it completely unblocks the ventilation opening 70. This allows the air to escape from the ventilation chamber 76 through the duct 74 and the full cross section of the ventilation opening 70, into the ventilation line 42 and on into the reservoir 20.

During the ventilation process, the ventilation chamber 76 fills with the urea/water mixture. This buoys up the float 62, causing it to press the valve element 58 upward counter to the force of the compression spring 67 until it comes into contact with the spacer 66. This reduces the cross section of ventilation opening 70 and ends up closing it almost completely. The urea/water mixture now escapes from the ventilation chamber 76 through the outlet opening 72, which has a comparatively large diameter, into the section of the line 28 downstream of the float valve 40 toward the filter 24.

At the same time, a small flow of urea/water mixture travels through the duct 74 and the region of the ventilation opening 70 not completely covered by the valve element 58 and on through the ventilation line 42 back to the reservoir 20. As a result, urea that has crystallized in the region of the ventilation opening 70 is entrained, dissolved, and washed back into the reservoir 20.

The float valve 40 is designed so that it can function not only in the vertical position depicted in FIG. 2, but also in a position inclined by +/−45° in relation to this. It is consequently possible to install the apparatus 18 as a whole in a position range from 0 to 90° without requiring changes in the design of the float valve 40.

In an exemplary embodiment not shown here, the ventilation device 40 is embodied as a solenoid valve that is opened or closed by a control unit. The solenoid valve is designed so that even in its "closed" position, a small quantity of the urea/water mixture can flow back to the reservoir via the ventilation line, thus allowing crystallized urea in the region of the solenoid valve to be entrained, dissolved, and washed back into the reservoir.

Figure 3:
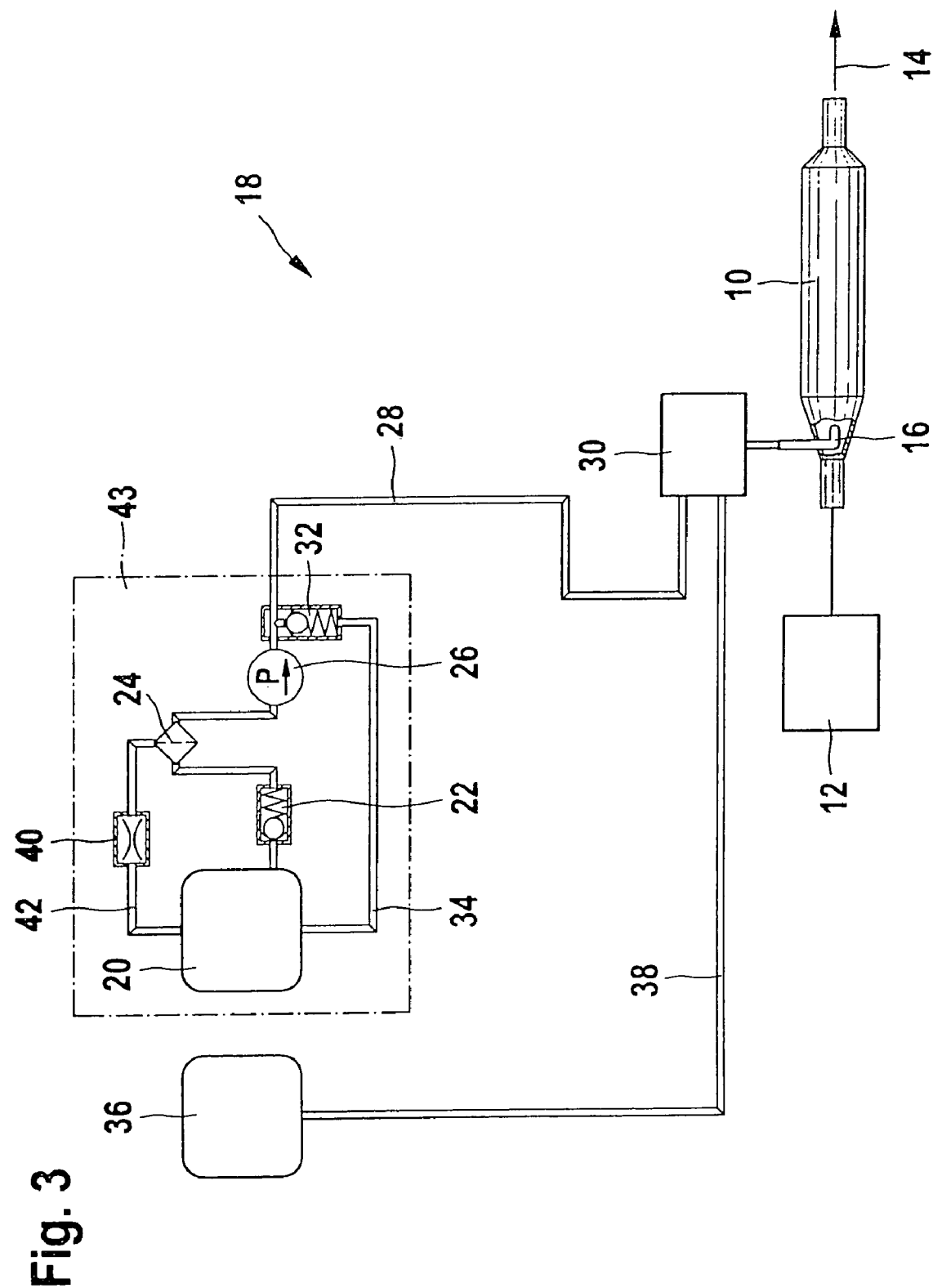
FIG. 3 is a depiction similar to FIG. 1 of a second exemplary embodiment.

Another alternative embodiment form is depicted in FIG. 3. Elements and regions that have functions equivalent to elements and regions in the exemplary embodiment shown in FIG. 1 have been provided with the same reference numerals. They are not explained again in detail.

In the exemplary embodiment depicted in FIG. 3, the ventilation device 40 is comprised of a flow throttle situated in the ventilation line 42. The ventilation line 42 branches off directly from the filter 24 at the geodetically highest point of the apparatus 18. During operation of the apparatus 18, the ventilation line 42 with the flow throttle 40 continuously conveys air and/or urea/water mixture from the line 28 back to the reservoir 20. The flow throttle 40 is dimensioned to allow the pressure in the line 28 required to generate the aerosol in the mixing chamber 30 to be maintained under all circumstances.

The foregoing relates to preferred exemplary embodiments of the invention, it being understood that other variants and embodiments thereof are possible within the spirit and scope of the invention, the latter being defined by the appended claims.

The invention claimed is:

1. An apparatus for introducing a reducing agent containing urea into the exhaust of an internal combustion engine, the apparatus comprising
   a reservoir,
   a delivery unit,
   a flow path for the reducing agent, the flow path leading from the reservoir to the delivery unit, the delivery unit delivering the reducing agent from the reservoir through the flow path,
   a ventilation device for ventilating at least one region of the flow path, the ventilation device being disposed in the flow path leading from the reservoir to the delivery unit and being situated at a geodetic high point of the flow path,
   a ventilation opening in the ventilation device that always permits a return of a minimal fluid quantity to the reservoir, and
   a ventilation return line connecting the ventilation opening and the reservoir.

2. The apparatus according to claim 1, wherein the ventilation device comprises a float valve.

3. The apparatus according to claim 1, wherein the ventilation device includes a solenoid valve.

4. The apparatus according to claim 1, wherein the ventilation device comprises a flow throttle.

5. The apparatus according to claim 1, further comprising a filter, and wherein the ventilation device is situated in the filter or in close proximity to the filter.

6. The apparatus according to claim 2, further comprising a filter, and wherein the ventilation device is situated in the filter or in close proximity to the filter.

7. The apparatus according to claim 3, further comprising a filter, and wherein the ventilation device is situated in the filter or in close proximity to the filter.

8. The apparatus according to claim 4, further comprising a filter, and wherein the ventilation device is situated in the filter or in close proximity to the filter.

9. The apparatus according to claim 5, wherein the filter is able to operate in two different installation positions that differ from each other by approximately 90° and wherein the ventilation device is situated at an angle of approximately 45° between the two installation positions.

10. The apparatus according to claim 6, wherein the filter is able to operate in two different installation positions that differ from each other by approximately 90° and wherein the ventilation device is situated at an angle of approximately 45° between the two installation positions.

11. The apparatus according to claim 7, wherein the filter is able to operate in two different installation positions that differ from each other by approximately 90° and wherein the ventilation device is situated at an angle of approximately 45° between the two installation positions.

12. The apparatus according to claim 8, wherein the filter is able to operate in two different installation positions that differ from each other by approximately 90° and wherein the ventilation device is situated at an angle of approximately 45° between the two installation positions.

13. The apparatus according to claim 1, wherein the ventilation device is situated upstream of the delivery unit.

14. The apparatus according to claim 2, wherein the ventilation device is situated upstream of the delivery unit.

15. The apparatus according to claim 3, wherein the ventilation device is situated upstream of the delivery unit.

16. The apparatus according to claim 4, wherein the ventilation device is situated upstream of the delivery unit.

17. The apparatus according to claim 5, wherein the ventilation device is situated upstream of the delivery unit.

18. The apparatus according to claim 9, wherein the ventilation device is situated upstream of the delivery unit.

19. An apparatus for introducing a reducing agent containing urea into the exhaust of an internal combustion engine, the apparatus comprising
   a reservoir,
   a delivery unit,
   a flow path for the reducing agent, the flow path leading from the reservoir to the delivery unit, the delivery unit delivering the reducing agent from the reservoir through the flow path,
   a ventilation device for ventilating at least one region of the flow path, the ventilation device being disposed in the flow path leading from the reservoir to the delivery unfit and being situated at a geodetic high point of the flow path,
   a ventilation opening in the ventilation device that always permits a return of a minimal fluid quantity to the reservoir, and
a ventilation return line connecting the ventilation opening and the reservoir, wherein the ventilation device comprises a float valve.

* * * * *

UNITED STATES PATENT AND TRADEMARK OFFICE
CERTIFICATE OF CORRECTION

PATENT NO.       : 7,594,393 B2
APPLICATION NO. : 10/577990
DATED            : September 29, 2009
INVENTOR(S)      : Offenhuber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 481 days.

Signed and Sealed this

Twenty-eighth Day of September, 2010

David J. Kappos
*Director of the United States Patent and Trademark Office*